United States Patent

Ozai et al.

Patent Number: 5,743,951
Date of Patent: Apr. 28, 1998

[54] PRIMER COMPOSITION

[75] Inventors: Toshiyuki Ozai; Masatoshi Miyake; Shinichi Sato; Keisuke Imai; Masaharu Sato, all of Gunma-ken, Japan

[73] Assignee: Shin-Etsu Chemical Co., Ltd., Tokyo, Japan

[21] Appl. No.: 688,897

[22] Filed: Jul. 31, 1996

[30] Foreign Application Priority Data

Aug. 1, 1995 [JP] Japan .................. 7-215233
Dec. 15, 1995 [JP] Japan .................. 7-347628

[51] Int. Cl.$^6$ .................. C09D 183/06
[52] U.S. Cl. .................. 106/287.11
[58] Field of Search .................. 106/287.11

[56] References Cited

U.S. PATENT DOCUMENTS

| | | | |
|---|---|---|---|
| 3,832,203 | 8/1974 | Saunders et al. | 106/287.11 |
| 4,388,437 | 6/1983 | Ona | 106/287.11 |
| 4,769,308 | 9/1988 | Hiruma et al. | |
| 5,248,334 | 9/1993 | Fey | 106/287.11 |
| 5,300,611 | 4/1994 | Fujioka et al. | |

FOREIGN PATENT DOCUMENTS

| | | |
|---|---|---|
| 0220733 | 5/1987 | European Pat. Off. |
| 0373562 | 6/1990 | European Pat. Off. |
| 0384401 | 8/1990 | European Pat. Off. |
| 2-219885 | 9/1990 | Japan |
| 6-128553 | 5/1994 | Japan |

*Primary Examiner*—David Brunsman
*Attorney, Agent, or Firm*—Lowe, Price, LeBlanc & Becker

[57] ABSTRACT

A primer composition comprises (A) an organosilicon compound of the general formula (1)

$$H_2N-(R-N)_b-R^1-Si-(OR^2)_{3-a} \quad \text{with substituents } H \text{ and } R^2_a \text{ on Si} \tag{1}$$

wherein R represents an alkylene group having from 1 to 6 carbon atoms, $R^1$ represents a divalent hydrocarbon group having not less than 4 carbon atoms, $R^2$'s may be the same or different and independently represent an unsubstituted or substituted monovalent hydrocarbon group, a is 0 or 1, and b is 0, 1, 2 or 3, and (B) a catalyst for condensation of the organosilicon compound and (C) an organopolysiloxane resin.

12 Claims, No Drawings

PRIMER COMPOSITION

BACKGROUND OF THE INVENTION

1. Field of the Invention

This invention relates to a primer composition which ensures good adhesion between an adherend formed with an electrodeposition coating on the surface thereof and a room temperature curable silicone rubber body and is thus useful as a primer for sealants.

2. Description of the Prior Art

Silicone rubbers exhibit good heat resistance, cold resistance, weatherability and electric insulating properties, and have wide utility in the fields of sealing materials for buildings, adhesive sealing materials, electric insulating materials, potting materials and the like. Where strong adhesion is necessary between adherends and silicone rubbers as with sealants for buildings and adhesive sealing materials, usual practice is to pretreat the adherend with primers.

The primers employed for room temperature curable silicone rubbers which are used as a sealant for buildings include, for example, compositions which comprise silane coupling agents and/or reaction products thereof, polyester resin and acrylic resins, and compositions which comprise phenyl group-containing siloxanes, alkyl silicates and chlorosilanes.

In recent years, acrylic resin paints or fluorine resin paints, which exhibit good weatherability, chemical resistance, electric insulating properties and inflammability, have been applied by electropainting or spraying and widely used as a coating for outer walls of buildings. Accordingly, there has been a demand of development of primers which have good adhesion to the coating films, especially to the films obtained by the electropainting.

Japanese Laid-open Application No. 2-219885 proposes a primer composition which comprises a hydroxyl group or alkoxy group-containing organopolysiloxane, an amino group-containing silane and a titanic acid ester. Japanese Laid-open Application No. 6-128553 proposes a primer composition which comprises a hydroxyl group or alkoxy group-containing organopolysiloxane, an organosilicon compound having an amino group and at least two alkoxy groups, an organosilicon compound having a mercapto group and at least two alkoxy groups, and an organotitanium and/or organozirconium compound. Although adhesion to metals to be painted is improved to some extent, it is not always satisfactory. Especially, the adhesion between an adherend such as an electropainted metal and a room temperature curable silicone rubber is not satisfactory.

SUMMARY OF THE INVENTION

It is accordingly an object of the invention to provide a primer composition which can overcome the problems of the prior art primer compositions and which is able not only to strongly adhere to adherends such as metals, glass, concrete and the like, but also to ensure strong bonding between adherends on which acrylic resins or fluorine resins have been electropainted and silicone rubbers.

The above object can be achieved, according to the invention, by a primer composition which comprises:

(A) an organosilicon compound of the general formula (1)

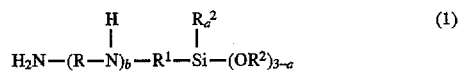

wherein R represents an alkylene group having from 1 to 6 carbon atoms, $R^1$ represents a divalent hydrocarbon group having not less than 4 carbon atoms, $R^2$'s may be the same or different and independently represent an unsubstituted or substituted monovalent hydrocarbon group, a is 0 or 1, and b is 0, 1, 2 or 3; and (B) a catalyst for condensation of the organosilicon compound.

DETAILED DESCRIPTION OF THE INVENTION (A) Organosilicon compounds

The organosilicon compounds used in the present invention are represented by the formula (1) and are an important component which ensures good adhesion imparted to the composition.

In the formula (1), R represents an alkylene group having from 1 to 6 carbon atoms. Specific examples include —CH$_2$—, —CH$_2$CH$_2$—, —CH$_2$CH$_2$CH$_2$—, —CH$_2$CH$_2$CH$_2$CH$_2$— and the like, of which —CH$_2$CH$_2$— is preferred.

$R^1$ represents a divalent hydrocarbon group having not less than 4 carbon atoms, preferably 4 to 30 carbon atoms, and more preferably from 6 to 12 carbon atoms. If the number of carbon atoms is less than 4, satisfactory adhesion between an electropainted adherend and a silicone rubber may not be attained. Examples of the divalent hydrocarbon group include phenylene group-containing divalent hydrocarbon groups such as

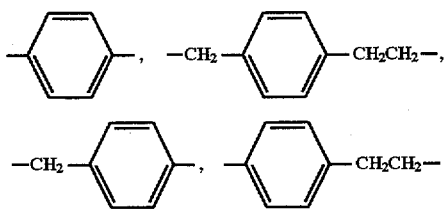

and the like, and cyclohexylene group-containing divalent hydrocarbon groups such as

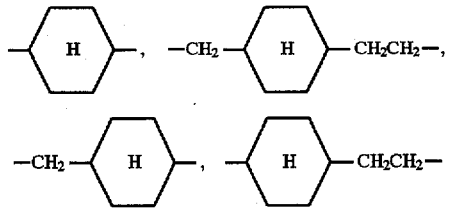

and the like, linear alkylene groups of the formula, —(CH$_2$)$_n$— wherein n is an integer of 4 or above such as —(CH$_2$)$_4$—, —(CH$_2$)$_8$—, —(CH$_2$)$_{12}$— and the like, and unsaturation bond-containing divalent hydrocarbon groups such as —CH=CH—CH=CH—. Of these, the phenylene group and the phenylene-group containing divalent hydrocarbon groups are preferred. If b is 0 or 1, $R^2$'s may be the same or different and represent a substituted or unsubstituted monovalent hydrocarbon group, preferably an alkyl group having from 1 to 4 carbon atoms, and more preferably methyl or ethyl. a is 0 or 1, preferably 0. b is 0 or an integer of 1 to 3, preferably 0 or 1.

Specific examples of the (A) component are those shown below:

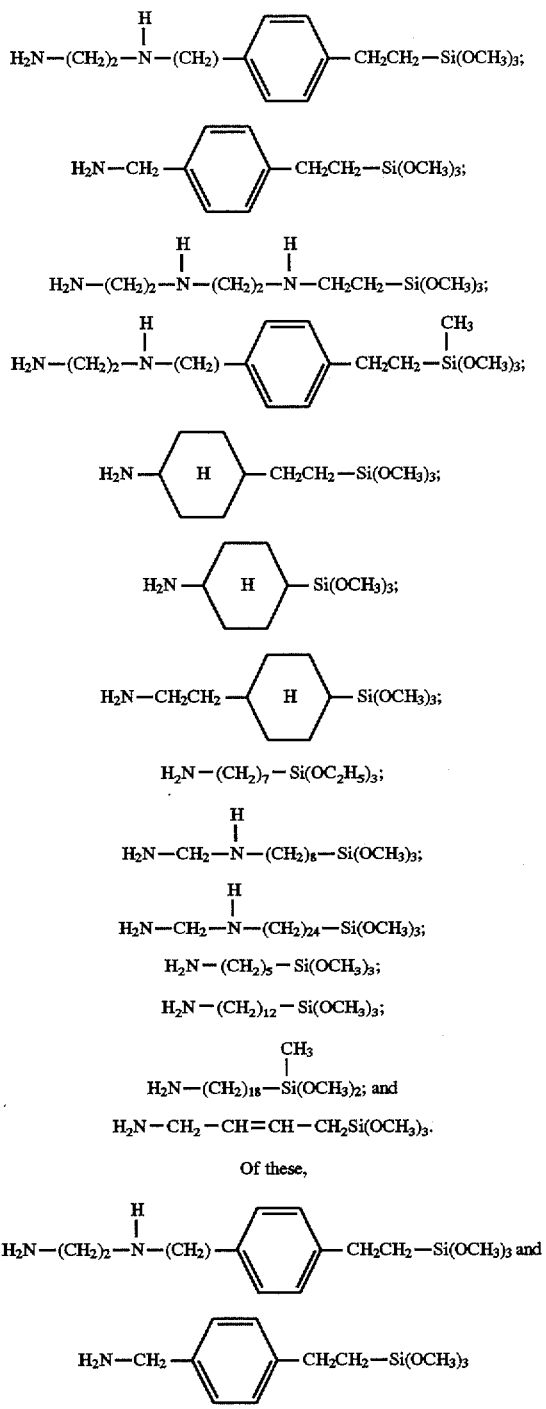

are preferred.

The condensation catalyst of the (B) component serves as a catalyst for curing the organosilicon compound of the (A) component. This component itself is taken in and becomes part of a final primer layer, thereby forming a strong film. The condensation catalysts include tin compounds, titanium compounds, zirconium compounds and aluminum compounds. Examples of the catalyst include titanium tetraalkoxides of the formula, $Ti(OR^4)_4$ and/or partial hydrolyzates thereof, zirconium tetraalkoxides of the formula, $Zr(OR^4)_4$ and/or partial hydrolyzates thereof, tin tetraalkoxides of the formula, $Sn(OR^4)_4$ and/or partial hydrolyzates thereof, and aluminum trialkoxides of the formula, $Al(OR^4)_3$ and/or partial hydrolyzates thereof, in which $R^4$ is as defined with respect to $R^2$ and preferably represents a monovalent hydrocarbon group having from 1 to 4 carbon atoms.

Specific examples of the titanium alkoxides include titanium tetramethoxide, titanium tetraethoxide, titanium tetrapropoxide, titanium tetraisopropoxide, titanium tetrabutoxide and the like, of which titanium tetraethoxide is preferred. Examples of the zirconium tetraalkoxides include zirconium tetramethoxide, zirconium tetraethoxide, zirconium tetrapropoxide, zirconium tetraisopropoxide, zirconium tetrabutoxide and the like, of which zirconium tetraethoxide is preferred. Examples of the tin tetraalkoxides include tin tetramethoxide, tin tetraethoxide, tin tetrapropoxide, tin tetraisopropoxide, tin tetrabutoxide, tin tetra-t-butoxide and the like, of which tin tetra-t-butoxide is preferred. Examples of aluminum trioxides include aluminum (III) ethoxide, aluminum (III) isopropoxide, aluminum (III) S-butoxide, aluminum (III) n-butoxide, mono-S-butoxyaluminum diisopropoxide and the like, of which aluminum (III) S-butoxide, aluminum (III) n-butoxide and mono-S-butoxyaluminum diisopropoxide are preferred. These compounds may be used singly or in combination.

The (B) component should preferably be used in amounts of 5 to 500 parts by weight, more preferably from 10 to 200 parts by weight, per 100 parts by weight of the (A) component. If the amount is less than 5 parts by weight, there is some possibility that the resultant film is not always satisfactory with respect to the strength and adhesion. Over 500 parts by weight, the film may become too hard to attain satisfactory adhesion.

In order to further improve the adhesion of the primer composition, it is preferred to add, as (C) component, an organopolysiloxane resin of the following average compositional formula (2) to the primer composition $$R^3_c SiO_{4-c/2} \quad (2)$$

wherein each $R^3$ independently represents an unsubstituted or substituted monovalent hydrocarbon group having, preferably from 1 to 10 carbon atoms, and c is a positive value of from 0.4 to 1.8.

Specific examples of the monovalent hydrocarbon group include alkyl groups such as methyl, ethyl, propyl and the like, alkenyl groups such as vinyl allyl and the like, aryl groups such as phenyl, tolyl and the like, cycloalkyl groups such as cyclohexyl, aralkyl groups such as benzyl, phenylethyl and the like, and those groups mentioned above wherein part or all of the hydrogen atoms in the groups are substituted with a halogen atom or a cyano group, e.g. chloromethyl, trifluoropropyl, cyanoethyl and the like. Of these, the alkyl and aryl groups are preferred. More preferably, methyl or phenyl is mentioned.

If c is a value smaller than 0.4, the resultant organopolysiloxane becomes too hard and satisfactory adhesion will not develop. On the other hand, when c exceeds 1.8, the resultant product is, for example, diorganopolysiloxane such as silicone oil. This is not satisfactory with respect to adhesion.

The organopolysiloxane resin of (C) component can be readily obtained by co-hydrolysis or hydrolysis of chlorosilanes or alkoxysilanes. Preferably, co-hydrolyzates of chlorosilanes or alkoxysilanes of the formulas, $R^3_2SiX_2$ and $R_3SiX_3$ wherein $R_3$ is same as defined above, and X is chlorine or $OR^2$ in which $R^2$ is same as defined before, or co-hydrolyzates of chlorosilanes or alkoxysilanes of the formulas, $R^3{}_3SiX$ and $SiX_4$ wherein $R_3$ and X are, respectively, as defined above, are used. In the above formulas, the group represented by $R^3$ is preferably methyl or phenyl. When the chlorosilanes or alkoxysilanes of the formulas, $R^3{}_2SiX_2$ and $R_3SiX_3$, are co-hydrolyzed, the resultant organopolysiloxane resin consists of $R^3{}_2SiO_{2/2}$ units (D units) and $R^3SiO_{3/2}$ units (T units). With the co-hydrolysis of the compounds of the formulas, $R^3{}_3SiX$ and $SiX_4$, the organopolysiloxane resin obtained consists of $R^3{}_3Si_{1/2}$ units (M units) and $SiO_{4/2}$ units (Q units). The ratio between the D and T units and the ratio between the M and Q units are, respectively, so selected that c is within a range of 0.4 to 1.8.

The organopolysiloxane resin usually has a hydroxyl group at both ends thereof.

The amount of the organopolysiloxane should preferably be in the range of from 10 to 900 parts by weight, more preferably from 30 to 300 parts by weight, per 100 parts by weight of the (A) component.

The primer composition of the invention should preferably be dissolved in organic solvents in order to allow easy coating and working operations. The organic solvents used for this purpose are not critical so far as they are able to dissolve the components of the primer composition therein and are volatile in nature. Examples of such solvents include benzene, toluene, xylene, methanol, ethanol, isopropyl alcohol, butanol, ethylene glycol monomethyl alcohol, acetone, methyl ethyl ketone, ligroin, ethyl acetate, hexane, dioxane, tetrahydrofuran and the like. These solvents may be used on their own or in admixture.

The concentration of the primer composition in an organic solvent should preferably be within a range of 1 to 50 wt %. If the concentration is less than 1 wt %, adhesion may become unsatisfactory. On the other hand, when the concentration exceeds 50 wt %, coating and working operations may not proceed smoothly.

The primer composition of the invention is readily obtained by uniformly mixing the components (A) and (B) along with the component (C), if necessary.

Moreover, pigments, heat resistance improvers and other additives may be added within ranges of amounts not impeding the purposes of the invention.

The primer composition of the invention may be coated on adherends made, for example, of metals or synthetic resins by brushing or spraying, followed by air-drying for a time of five minutes to 24 hours, preferably from 10 minutes to 12 hours and adhesion to silicone rubber. Alternatively, after the air-drying, the coated composition may be heated to make a harder film, followed by adhesion to silicone rubber.

The primer composition of the invention can strongly bond together an adherend, on which an acrylic resin or fluorine resin has been electropainted, and a room temperature curable silicone rubber body together. Accordingly, the composition is very useful as a primer for silicone sealants used for buildings and electropainted building materials.

The present invention is more particularly described by way of examples, which should not be construed as limiting the invention. In the examples, parts are by weight. Comparative examples are also described.

Examples 1 to 9 and Comparative Examples 1 to 6

Different primer compositions were prepared by uniformly mixing components at mixing ratios indicated in Tables 1 and 2.

An aluminum plate on which an acrylic resin paint AG 300 (commercial name of Kansai Paint Co., Ltd.) had been electropainted and an aluminum plate on which a fluorine resin paint Dick Flow S (commercial name of Kansai Paint Co., Ltd.) were, respectively, provided as an adherend. The surfaces of these plates were each washed with toluene and applied with each primer composition by brushing, followed by air-drying to form a primer film. Subsequently, a room temperature curable silicone rubber of the condensation type (Sealant New 70 of Shin-Etsu Chemical Co., Ltd.) was applied onto the primer film surface and cured. After 14 days, the adhesion between the cured silicone rubber and each of the painted aluminum plate was determined according to the method described in JIS-A-5758. The results are shown in Tables 3 and 4.

TABLE 1

|  | Example | | | | | | | | |
|---|---|---|---|---|---|---|---|---|---|
|  | 1 | 2 | 3 | 4 | 5 | 6 | 7 | 8 | 9 |
| 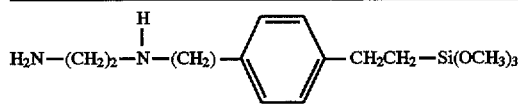 | 2.5 | 2.5 | 2.5 | 2.5 | 2.5 | 2.5 | 0 | 0 | 0 |
| 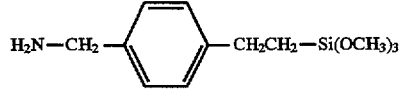 | 0 | 0 | 0 | 0 | 0 | 0 | 2.5 | 2.5 | 2.5 |
| * methylphenylpolysiloxane resin | 2.5 | 2.5 | 2.5 | 5.0 | 2.5 | 2.5 | 2.5 | 5.0 | 1.5 |
| titanium tetraethoxide | 0 | 2.5 | 0 | 2.5 | 2.5 | 1.0 | 2.5 | 7.5 | 0 |
| zirconium tetraisopropoxide | 2.5 | 0 | 2.5 | 0 | 0 | 0 | 0 | 0 | 2.5 |
| hexane | 100 | 0 | 50 | 100 | 100 | 100 | 100 | 50 | 100 |
| toluene | 0 | 100 | 50 | 0 | 0 | 0 | 0 | 50 | 0 |

* Co-hydrolyzate of methyltrichlorosilane and methylphenyldichlorosilane (corresponding to a resin of the afore-indicated formula (2) wherein c = 0.9).

TABLE 2

|  | Comparative Example | | | | | |
|---|---|---|---|---|---|---|
|  | 1 | 2 | 3 | 4 | 5 | 6 |
| $H_2N-(CH_2)_2-NH-(CH_2)-C_6H_4-CH_2CH_2-Si(OCH_3)_3$ | 2.5 | 0 | 0 | 0 | 0 | 2.5 |
| $H_2N-CH_2-C_6H_4-CH_2CH_2-Si(OCH_3)_3$ | 0 | 0 | 0 | 0 | 0 | 0 |
| $H_2N-(CH_2)_2-Si(OCH_2CH_3)_3$ | 0 | 0 | 2.5 | 0 | 2.5 | 0 |
| $HS-(CH_2)_3-Si(OCH_3)_3$ | 0 | 0 | 0 | 2.5 | 2.5 | 0 |
| methylphenylpolysiloxane resin | 2.5 | 2.5 | 2.5 | 2.5 | 2.5 | 0 |
| $HO-[Si(CH_3)_2 O]_{10}-H$ | 0 | 0 | 0 | 0 | 0 | 2.5 |
| titanium tetraethoxide | 0 | 2.5 | 2.5 | 2.5 | 2.5 | 2.5 |
| zirconium tetraisopropoxide | 0 | 0 | 0 | 0 | 0 | 0 |
| hexane | 100 | 0 | 0 | 0 | 0 | 0 |
| toluene | 0 | 100 | 100 | 100 | 100 | 100 |

TABLE 3

| Adherend | | Example | | | | | | | | |
|---|---|---|---|---|---|---|---|---|---|---|
|  |  | 1 | 2 | 3 | 4 | 5 | 6 | 7 | 8 | 9 |
| Acrylic resin paint electropainted aluminum plate | rubber breakage (%) | 100 | 100 | 100 | 100 | 100 | 100 | 100 | 100 | 100 |
|  | interfacial breakage (%) | 0 | 0 | 0 | 0 | 0 | 0 | 0 | 0 | 0 |
| Fluorine resin paint electropainted aluminum plate | rubber breakage (%) | 100 | 100 | 100 | 100 | 100 | 100 | 100 | 100 | 100 |
|  | interfacial breakage (%) | 0 | 0 | 0 | 0 | 0 | 0 | 0 | 0 | 0 |

TABLE 4

| Adherend | | Comparative Example | | | | | |
|---|---|---|---|---|---|---|---|
|  |  | 1 | 2 | 3 | 4 | 5 | 6 |
| Acrylic resin paint electropainted aluminum plate | rubber breakage (%) | 0 | 0 | 0 | 0 | 35 | 15 |
|  | interfacial breakage (%) | 100 | 100 | 100 | 100 | 65 | 85 |
| Fluorine resin paint electropainted aluminum plate | rubber breakage (%) | 0 | 0 | 0 | 0 | 30 | 10 |
|  | interfacial breakage (%) | 100 | 100 | 100 | 100 | 70 | 90 |

Examples 10 to 16 and Comparative Examples 7 to 13

Different primer compositions were further prepared by uniformly mixing components at mixing ratios indicated in Tables 5 and 6.

Aluminum plates on which acrylic resin paints AG 300 and AG 200 (commercial names of Kansai Paint Co., Ltd.) had been, respectively, electropainted, and an aluminum plate on which a fluorine resin paint Dick Flow S (commercial name of Kansai Paint Co., Ltd.) were, respectively, provided as an adherend. The surfaces of these plates were each washed with toluene and applied with each primer composition by brushing, followed by air-drying to form a primer film. Subsequently, a room temperature curable silicone rubber of the condensation type (Sealant New 70 of Shin-Etsu Chemical Co., Ltd.) was applied onto the primer film surface and cured. The adhesion between the cured silicone rubber and each of the painted aluminum plate after 14 days was determined as an initial adhesion. Moreover, each sample was subjected to an immersion test for 7 days wherein the sample was immersed in water at 50°

C. Thereafter, the adhesion of the immersed sample was determined as an adhesion after immersion in water. These adhesions were determined by the method described in JIS-A-5758. The results are shown in Tables 7 and 8.

TABLE 5

| | Example | | | | | | |
|---|---|---|---|---|---|---|---|
| | 10 | 11 | 12 | 13 | 14 | 15 | 16 |
| H₂N—(CH₂)₂—NH—(CH₂)—C₆H₄—(CH₂)₂—Si(OCH₃)₃ | 2.5 | 0 | 2.5 | 2.5 | 2.5 | 2.5 | 2.5 |
| H₂N—CH₂—C₆H₄—CH₂CH₂—Si(OCH₃)₃ | 0 | 2.5 | 0 | 0 | 0 | 0 | 0 |
| titanium tetraethoxide | 2.5 | 2.5 | 0 | 0 | 0 | 2 | 2 |
| zirconium tetraisopropoxide | 0 | 0 | 2.5 | 0 | 0 | 0.5 | 0 |
| tin tetra-t-butoxide | 0 | 0 | 0 | 2.5 | 0 | 0 | 0.5 |
| aluminum tri-s-butoxide | 0 | 0 | 0 | 0 | 2.5 | 0 | 0 |
| hexane | 90 | 90 | 90 | 90 | 90 | 90 | 90 |
| isopropanol | 10 | 10 | 10 | 10 | 10 | 10 | 10 |

TABLE 6

| | Comparative Example | | | | | | |
|---|---|---|---|---|---|---|---|
| | 7 | 8 | 9 | 10 | 11 | 12 | 13 |
| H₂N—(CH₂)₂—NH—(CH₂)—C₆H₄—(CH₂)₂—Si(OCH₃)₃ | 2.5 | 0 | 0 | 0 | 0 | 0 | 0 |
| H₂N—CH₂—C₆H₄—CH₂CH₂—Si(OCH₃)₃ | 0 | 0 | 0 | 0 | 0 | 0 | 0 |
| $H_2NC_3H_6Si(OC_2H_5)_3$ | 0 | 0 | 0 | 0 | 0 | 2.5 | 0 |
| $H_2NC_2H_4NHC_3H_6Si(OCH_3)_3$ | 0 | 0 | 0 | 0 | 0 | 0 | 2.5 |
| titanium tetraethoxide | 0 | 2.5 | 0 | 0 | 0 | 2.5 | 2.5 |
| zirconium tetraisopropoxide | 0 | 0 | 2.5 | 0 | 0 | 0 | 0 |
| tin tetra-t-butoxide | 0 | 0 | 0 | 2.5 | 0 | 0 | 0 |
| aluminum tri-s-butoxide | 0 | 0 | 0 | 0 | 2.5 | 0 | 0 |
| hexane | 90 | 90 | 90 | 90 | 90 | 90 | 90 |
| isopropanol | 10 | 10 | 10 | 10 | 10 | 10 | 10 |

TABLE 7

| Adherend | | Example | | | | | | |
|---|---|---|---|---|---|---|---|---|
| | | 10 | 11 | 12 | 13 | 14 | 15 | 16 |
| Acrylic resin paint AG 300-electropainted aluminum plate | initial rubber breakage (%) | 100 | 100 | 100 | 100 | 100 | 100 | 100 |
| | initial interfacial breakage (%) | 0 | 0 | 0 | 0 | 0 | 0 | 0 |
| | rubber breakage after immersion in water (%) | 100 | 100 | 100 | 100 | 100 | 100 | 100 |
| | interfacial breakage after immersion in water (%) | 0 | 0 | 0 | 0 | 0 | 0 | 0 |

TABLE 7-continued

| Adherend | | Example | | | | | | |
|---|---|---|---|---|---|---|---|---|
| | | 10 | 11 | 12 | 13 | 14 | 15 | 16 |
| Acrylic resin paint AG 200-electropainted aluminum plate | initial rubber breakage (%) | 100 | 100 | 100 | 100 | 100 | 100 | 100 |
| | initial interfacial breakage (%) | 0 | 0 | 0 | 0 | 0 | 0 | 0 |
| | rubber breakage after immersion in water (%) | 100 | 100 | 100 | 100 | 100 | 100 | 100 |
| | interfacial breakage after immersion in water (%) | 0 | 0 | 0 | 0 | 0 | 0 | 0 |
| Fluorine resin paint-electropainted aluminum plate | initial rubber breakage (%) | 100 | 100 | 100 | 100 | 100 | 100 | 100 |
| | initial interfacial breakage (%) | 0 | 0 | 0 | 0 | 0 | 0 | 0 |
| | rubber breakage after immersion in water (%) | 100 | 100 | 100 | 100 | 100 | 100 | 100 |
| | interfacial breakage after immersion in water (%) | 0 | 0 | 0 | 0 | 0 | 0 | 0 |

TABLE 8

| Adherend | | Comparative Example | | | | | | |
|---|---|---|---|---|---|---|---|---|
| | | 7 | 8 | 9 | 10 | 11 | 12 | 13 |
| Acrylic resin paint AG 300-electropainted aluminum plate | initial rubber breakage (%) | 0 | 0 | 0 | 0 | 0 | 100 | 100 |
| | initial interfacial breakage (%) | 100 | 100 | 100 | 100 | 100 | 0 | 0 |
| | rubber breakage after immersion in water (%) | 0 | 0 | 0 | 0 | 0 | 0 | 0 |
| | interfacial breakage after immersion in water (%) | 100 | 100 | 100 | 100 | 100 | 100 | 100 |
| Acrylic resin paint AG 200-electropainted aluminum plate | initial rubber breakage (%) | 0 | 0 | 0 | 0 | 0 | 100 | 100 |
| | initial interfacial breakage (%) | 100 | 100 | 100 | 100 | 100 | 0 | 0 |
| | rubber breakage after immersion in water (%) | 0 | 0 | 0 | 0 | 0 | 0 | 0 |
| | interfacial breakage after immersion in water (%) | 100 | 100 | 100 | 100 | 100 | 100 | 100 |
| Fluorine resin paint-electropainted aluminum plate | initial rubber breakage (%) | 0 | 0 | 0 | 0 | 0 | 100 | 100 |
| | initial interfacial breakage (%) | 100 | 100 | 100 | 100 | 100 | 0 | 0 |

TABLE 8-continued

|  | Comparative Example | | | | | | |
|---|---|---|---|---|---|---|---|
| Adherend | 7 | 8 | 9 | 10 | 11 | 12 | 13 |
| rubber breakage after immersion in water (%) | 100 | 0 | 0 | 0 | 0 | 100 | 100 |
| interfacial breakage after immersion in water (%) | 0 | 100 | 100 | 100 | 100 | 0 | 0 |

Examples 17 to 23 and Comparative Examples 14 to 20

Different primer compositions were prepared by uniformly mixing components at mixing ratios indicated in Tables 9 and 10.

Aluminum plates on which acrylic resin paints AG 300 and AG 200 (commercial names of Kansai Paint Co., Ltd.) had been, respectively, electropainted, and an aluminum plate on which a fluorine resin paint Dick Flow S (commercial name of Kansai Paint Co., Ltd.) were, respectively, provided as an adherend. The surfaces of these plates were each washed with toluene and applied with each primer composition by brushing, followed by air-drying to form a primer film. Subsequently, a room temperature curable silicone rubber of the condensation type (Sealant New 70 of Shin-Etsu Chemical Co., Ltd.) was applied onto the primer film surface and cured. The adhesion between the cured silicone rubber and each of the painted aluminum plate after 14 days was determined as an initial adhesion. Moreover, each sample was subjected to an immersion test for 7 days wherein the sample was immersed in water at 50° C. Thereafter, the adhesion of the immersed sample was determined as an adhesion after immersion in water. These adhesions were determined by the method described in JIS-A-5758. The results are shown in Tables 11 and 12.

TABLE 9

|  | Example | | | | | | |
|---|---|---|---|---|---|---|---|
|  | 17 | 18 | 19 | 20 | 21 | 22 | 23 |
| $H_2N-CH_2-\underset{\underset{H}{\mid}}{N}-(CH_2)_{24}-Si(OCH_3)_3$ | 2.5 | 0 | 2.5 | 2.5 | 2.5 | 2.5 | 2.5 |
| $H_2N-(CH_2)_2-C_6H_{10}-Si(OCH_3)_3$ | 0 | 2.5 | 0 | 0 | 0 | 0 | 0 |
| titanium tetraethoxide | 2.5 | 2.5 | 0 | 0 | 0 | 2 | 2 |
| zirconium tetraisopropoxide | 0 | 0 | 2.5 | 0 | 0 | 0.5 | 0 |
| tin tetra-t-butoxide | 0 | 0 | 0 | 2.5 | 0 | 0 | 0.5 |
| aluminum tri-s-butoxide | 0 | 0 | 0 | 0 | 2.5 | 0 | 0 |
| hexane | 90 | 90 | 90 | 90 | 90 | 90 | 90 |
| iospropanol | 10 | 10 | 10 | 10 | 10 | 10 | 10 |

TABLE 10

|  | Comparative Example | | | | | | |
|---|---|---|---|---|---|---|---|
|  | 14 | 15 | 16 | 17 | 18 | 19 | 20 |
| $H_2N-CH_2-\underset{\underset{H}{\mid}}{N}-(CH_2)_{24}-Si(OCH_3)_3$ | 2.5 | 0 | 0 | 0 | 0 | 0 | 0 |
| $H_2N-(CH_2)_2-C_6H_{10}-Si(OCH_3)_3$ | 0 | 0 | 0 | 0 | 0 | 0 | 0 |
| $H_2NC_3H_6Si(OC_2H_5)_3$ | 0 | 0 | 0 | 0 | 0 | 2.5 | 0 |
| $H_2NC_2H_4NHC_3H_6Si(OCH_3)_3$ | 0 | 0 | 0 | 0 | 0 | 0 | 2.5 |
| titanium tetraethoxide | 0 | 2.5 | 0 | 0 | 0 | 2.5 | 2.5 |
| zirconium tetraisopropoxide | 0 | 0 | 2.5 | 0 | 0 | 0 | 0 |
| tin tetra-t-butoxide | 0 | 0 | 0 | 2.5 | 0 | 0 | 0 |
| aluminum tri-s-butoxide | 0 | 0 | 0 | 0 | 2.5 | 0 | 0 |
| hexane | 90 | 90 | 90 | 90 | 90 | 90 | 90 |
| iospropanol | 10 | 10 | 10 | 10 | 10 | 10 | 10 |

TABLE 11

| Adherend | | Example | | | | | | |
| --- | --- | --- | --- | --- | --- | --- | --- | --- |
| | | 17 | 18 | 19 | 20 | 21 | 22 | 23 |
| Acrylic resin paint AG 300- electropainted aluminum plate | initial rubber breakage (%) | 100 | 100 | 100 | 100 | 100 | 100 | 100 |
| | initial interfacial breakage (%) | 0 | 0 | 0 | 0 | 0 | 0 | 0 |
| | rubber breakage after immersion in water (%) | 100 | 100 | 100 | 100 | 100 | 100 | 100 |
| | interfacial breakage after immersion in water (%) | 0 | 0 | 0 | 0 | 0 | 0 | 0 |
| Acrylic resin paint AG 200- electropainted aluminum plate | initial rubber breakage (%) | 100 | 100 | 100 | 100 | 100 | 100 | 100 |
| | initial interfacial breakage (%) | 0 | 0 | 0 | 0 | 0 | 0 | 0 |
| | rubber breakage after immersion in water (%) | 100 | 100 | 100 | 100 | 100 | 100 | 100 |
| | interfacial breakage after immersion in water (%) | 0 | 0 | 0 | 0 | 0 | 0 | 0 |
| Fluorine resin paint- electropainted aluminum plate | initial rubber breakage (%) | 100 | 100 | 100 | 100 | 100 | 100 | 100 |
| | initial interfacial breakage (%) | 0 | 0 | 0 | 0 | 0 | 0 | 0 |
| | rubber breakage after immersion in water (%) | 100 | 100 | 100 | 100 | 100 | 100 | 100 |
| | interfacial breakage after immersion in water (%) | 0 | 0 | 0 | 0 | 0 | 0 | 0 |

TABLE 12

| Adherend | | Comparative Example | | | | | | |
| --- | --- | --- | --- | --- | --- | --- | --- | --- |
| | | 14 | 15 | 16 | 17 | 18 | 19 | 20 |
| Acrylic resin paint AG 300- electropainted aluminum plate | initial rubber breakage (%) | 0 | 0 | 0 | 0 | 0 | 100 | 100 |
| | initial interfacial breakage (%) | 100 | 100 | 100 | 100 | 100 | 0 | 0 |
| | rubber breakage after immersion in water (%) | 0 | 0 | 0 | 0 | 0 | 0 | 0 |
| | interfacial breakage after immersion in water (%) | 100 | 100 | 100 | 100 | 100 | 100 | 100 |
| Acrylic resin paint AG 200- electropainted aluminum plate | initial rubber breakage (%) | 0 | 0 | 0 | 0 | 0 | 100 | 100 |
| | initial interfacial breakage (%) | 100 | 100 | 100 | 100 | 100 | 0 | 0 |

TABLE 12-continued

| Adherend | | Comparative Example | | | | | | |
| --- | --- | --- | --- | --- | --- | --- | --- | --- |
| | | 14 | 15 | 16 | 17 | 18 | 19 | 20 |
| | rubber breakage after immersion in water (%) | 0 | 0 | 0 | 0 | 0 | 0 | 0 |
| | interfacial breakage after immersion in water (%) | 100 | 100 | 100 | 100 | 100 | 100 | 100 |
| Fluorine resin paint-electropainted aluminum plate | initial rubber breakage (%) | 0 | 0 | 0 | 0 | 0 | 100 | 100 |
| | initial interfacial breakage (%) | 100 | 100 | 100 | 100 | 100 | 0 | 0 |
| | rubber breakage after immersion in water (%) | 100 | 0 | 0 | 0 | 0 | 100 | 100 |
| | interfacial breakage after immersion in water (%) | 0 | 100 | 100 | 100 | 100 | 0 | 0 |

What is claimed is:

1. A primer composition which comprises:

(A) an organosilicon compound of the general formula (1)

$$H_2N-(R-N)_b-R^1-Si-(OR^2)_{3-a}$$
with H on N and $R^2_a$ on Si (1)

wherein R represents an alkylene group having from 1 to 6 carbon atoms, $R^1$ represents a divalent hydrocarbon group having not less than 4 carbon atoms, $R^2$'s may be the same or different and independently represent an unsubstituted or substituted monovalent hydrocarbon group, a is 0 or 1, and b is 0, 1, 2 or 3;

(B) a catalyst for condensation for the organosilicon compound; and (C) an organopolysiloxane resin of the following average compositional formula $$R^3_c SiO_{4-c/2}$$

wherein each $R^3$ independently represents an unsubstituted or substituted monovalent hydrocarbon group, and c is a positive value of from 0.4 to 1.8.

2. A primer composition according to claim 1, wherein $R^1$ represents —$CH_2CH_2$—.

3. A primer composition according to claim 1, wherein $R^1$ is a phenylene group or a phenylene group-containing divalent hydrocarbon group.

4. A primer composition according to claim 1, wherein each $R^2$ independently represents an alkyl group having from 1 to 4 carbon atoms.

5. A primer composition according to claim 1, wherein a is zero and b is 0 or 1.

6. A primer composition according to claim 1, wherein said organosilicon compound consists essentially of a compound of the formula

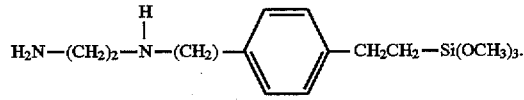

7. A primer composition according to claim 1, wherein said organosilicon compound consists essentially of a compound of the formula

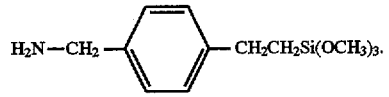

8. A primer composition according to claim 1 wherein said catalyst becomes part of a film obtained from said composition and is at least one member selected from the group consisting of titanium tetraalkoxides of the formula, $Ti(OR^4)_4$, and partial hydrolyzates thereof, zirconium tetraalkoxides of the formula, $Zr(OR^4)_4$, and partial hydrolyzates thereof, tin tetraalkoxides of the formula, $Sn(OR^4)_4$, and partial hydrolyzates thereof, and aluminum alkoxides and partial hydrolyzates thereof wherein each $R^4$ is same as $R^2$.

9. A primer composition according to claim 1, wherein said catalyst is present in an amount of from 5 to 500 parts by weight per 100 parts by weight of said organosilicon compound.

10. A primer composition according to claim 1, wherein said composition is dissolved in a solvent therefor at a concentration of 1 to 50 wt %.

11. A primer composition according to claim 1, wherein said composition is dissolved in a solvent therefor at a concentration of 1 to 50 wt %.

12. A primer composition according to claim 1, wherein said organopolysiloxane is present in an amount of 10 to 900 parts by weight per 100 parts by weight of said organosilicon compound.

* * * * *